(12) United States Patent
Dybalski et al.

(10) Patent No.: US 8,239,087 B2
(45) Date of Patent: Aug. 7, 2012

(54) METHOD OF OPERATING A VEHICLE ACCESSORY

(75) Inventors: Ronald H. Dybalski, Oxford, MI (US); Frederick J. Berg, Auburn, MI (US); Timothy J. Bennett, Kawkawlin, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 957 days.

(21) Appl. No.: 12/031,228

(22) Filed: Feb. 14, 2008

(65) Prior Publication Data

US 2009/0210110 A1    Aug. 20, 2009

(51) Int. Cl.
*G06F 5/00* (2006.01)

(52) U.S. Cl. ........... 701/29.1; 701/36; 701/49; 345/156; 345/173; 345/418; 345/649; 345/650; 345/652; 345/653; 345/654; 345/661

(58) Field of Classification Search .......... None
See application file for complete search history.

(56) References Cited

U.S. PATENT DOCUMENTS

| | | | | |
|---|---|---|---|---|
| 5,777,394 A * | 7/1998 | Arold | | 307/10.1 |
| 6,032,089 A * | 2/2000 | Buckley | | 701/36 |
| 6,185,491 B1 * | 2/2001 | Gray et al. | | 701/36 |
| 6,240,347 B1 * | 5/2001 | Everhart et al. | | 701/36 |
| 6,253,122 B1 * | 6/2001 | Razavi et al. | | 701/1 |
| 6,282,477 B1 * | 8/2001 | Gudat et al. | | 701/50 |
| 6,539,289 B2 * | 3/2003 | Ogino et al. | | 701/1 |
| 6,650,345 B1 * | 11/2003 | Saito et al. | | 715/764 |
| 6,655,465 B2 * | 12/2003 | Carlson et al. | | 172/4.5 |
| 6,865,460 B2 * | 3/2005 | Bray et al. | | 701/36 |
| 7,020,499 B2 | 3/2006 | Moffi et al. | | |
| 7,116,939 B1 | 10/2006 | Kandler | | |
| 7,415,352 B2 * | 8/2008 | Olcott | | 701/400 |
| 7,516,563 B2 * | 4/2009 | Koch | | 37/348 |
| 7,672,768 B2 * | 3/2010 | Narisawa et al. | | 701/50 |
| 7,683,771 B1 * | 3/2010 | Loeb | | 340/461 |
| 8,095,278 B2 * | 1/2012 | Schaaf et al. | | 701/49 |
| 2002/0154003 A1 * | 10/2002 | Ueda | | 340/425.5 |
| 2002/0181405 A1 * | 12/2002 | Ying | | 370/245 |
| 2003/0001751 A1 * | 1/2003 | Ogura et al. | | 340/691.6 |
| 2004/0036769 A1 * | 2/2004 | Sadahiro | | 348/148 |
| 2004/0225415 A1 * | 11/2004 | Newberry | | 701/1 |
| 2005/0004726 A1 * | 1/2005 | Paquet | | 701/36 |
| 2005/0027420 A1 * | 2/2005 | Fujishima et al. | | 701/50 |
| 2005/0203684 A1 * | 9/2005 | Borgesson | | 701/36 |
| 2005/0206623 A1 * | 9/2005 | Hein et al. | | 345/173 |
| 2005/0261815 A1 * | 11/2005 | Cowelchuk et al. | | 701/36 |
| 2005/0283285 A1 * | 12/2005 | Ying | | 701/29 |
| 2006/0036335 A1 * | 2/2006 | Banter et al. | | 700/17 |
| 2006/0041845 A1 * | 2/2006 | Ferguson et al. | | 715/751 |
| 2006/0155429 A1 * | 7/2006 | Boone et al. | | 701/1 |
| 2006/0195232 A1 * | 8/2006 | Obradovich | | 701/1 |
| 2007/0198472 A1 | 8/2007 | Simonds et al. | | |
| 2007/0208464 A1 * | 9/2007 | Moorhead | | 701/1 |
| 2007/0273207 A1 | 11/2007 | Dorn et al. | | |
| 2008/0042814 A1 * | 2/2008 | Hurwitz et al. | | 340/435 |
| 2008/0177440 A1 * | 7/2008 | Shibata et al. | | 701/36 |
| 2008/0302014 A1 * | 12/2008 | Szczerba et al. | | 49/31 |
| 2009/0024276 A1 * | 1/2009 | Mercurio et al. | | 701/36 |
| 2010/0107121 A1 * | 4/2010 | Kawachi | | 715/823 |

* cited by examiner

*Primary Examiner* — Jonathan M Dager

(74) *Attorney, Agent, or Firm* — Cantor Colburn LLP

(57) ABSTRACT

A vehicle includes a controller, a touch screen display in communication with the controller, and a plurality of accessories in communication with the controller. The various accessories are each individually controlled by inputting commands into the touch screen display. The controller transmits the inputted command via a communication system to the selected accessory to motivate the accessory between a first setting and a second setting.

13 Claims, 6 Drawing Sheets

METHOD OF OPERATING A VEHICLE ACCESSORY

BACKGROUND OF THE INVENTION

1. Field of the Invention

The subject invention relates to a vehicle and method of operating an accessory of the vehicle with a controller in communication with the accessory and including a touch screen display.

2. Description of the Prior Art

Vehicles include many accessories, such as a window actuator, a door actuator, a locking mechanism, an audio entertainment system, a visual entertainment system, a HVAC system, a power adjustment mechanism, a diagnostic mechanism, a sensor system and a lighting system. Individual switches located on or near an instrument panel of the vehicle or within reach of a driver of the vehicle control the various accessories. The switches are hard-wired to the various different accessories. The driver manipulates the switch to transmit a command through the wires interconnecting the switch and the accessory to the accessory.

U.S. Published Patent Application 2007/0198472 A1 to Simonds et al. discloses a vehicle having a multi-media system and a method for accessing data stored on portable electronic devices with the multi-media system. The multi-media system includes a controller and a user interface. The controller includes a processor. The user interface may include a touch screen display in communication with the controller. The controller is in communication with the portable electronic devices through either a hard wired connection or by the use of a wireless communication system, such as infrared, Bluetooth, and WI-FI. The controller detects the presence of the portable electronic device, and accesses data from the portable electronic device. A menu is displayed on the touch screen display identifying the content of the information stored on the portable electronic device. A user touches the touch screen display to input a command. The controller then executes the command inputted. The multi-media system permits the use and operation of the portable electronic devices through inputs entered into the touch screen display, thereby eliminating the need to handle the actual portable electronic devices.

SUMMARY OF THE INVENTION AND ADVANTAGES

The subject invention provides a vehicle comprising a controller and a touch screen display. The touch screen display is in communication with the controller for inputting commands into the controller. The vehicle further comprises at least one accessory, which is operable in at least a first setting and a second setting. A communication system interconnects the controller and the at least one accessory. The communication system transmits a command inputted into the touch screen display to the at least one accessory to move the at least one accessory between the first setting and the second setting.

The subject invention also provides a method of operating the accessory with the controller. The method comprises the steps of displaying a virtual image of the accessory on the touch screen display; touching the touch screen display to input a command for the accessory; transmitting the inputted command to the accessory; and executing the command.

Accordingly, the touch screen display of the subject invention provides a single source for a driver to input commands for all of the vehicle accessories. Because the controller communicates to all of the vehicle accessories through the communication system, there is no need to hard wire individual switches to the accessories. Therefore, the subject invention eliminates the need for each accessory to have a dedicated switch for controlling the accessory and all related wiring interconnecting the switches and the accessories.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a vehicle is shown generally at 20.

Figure 1:
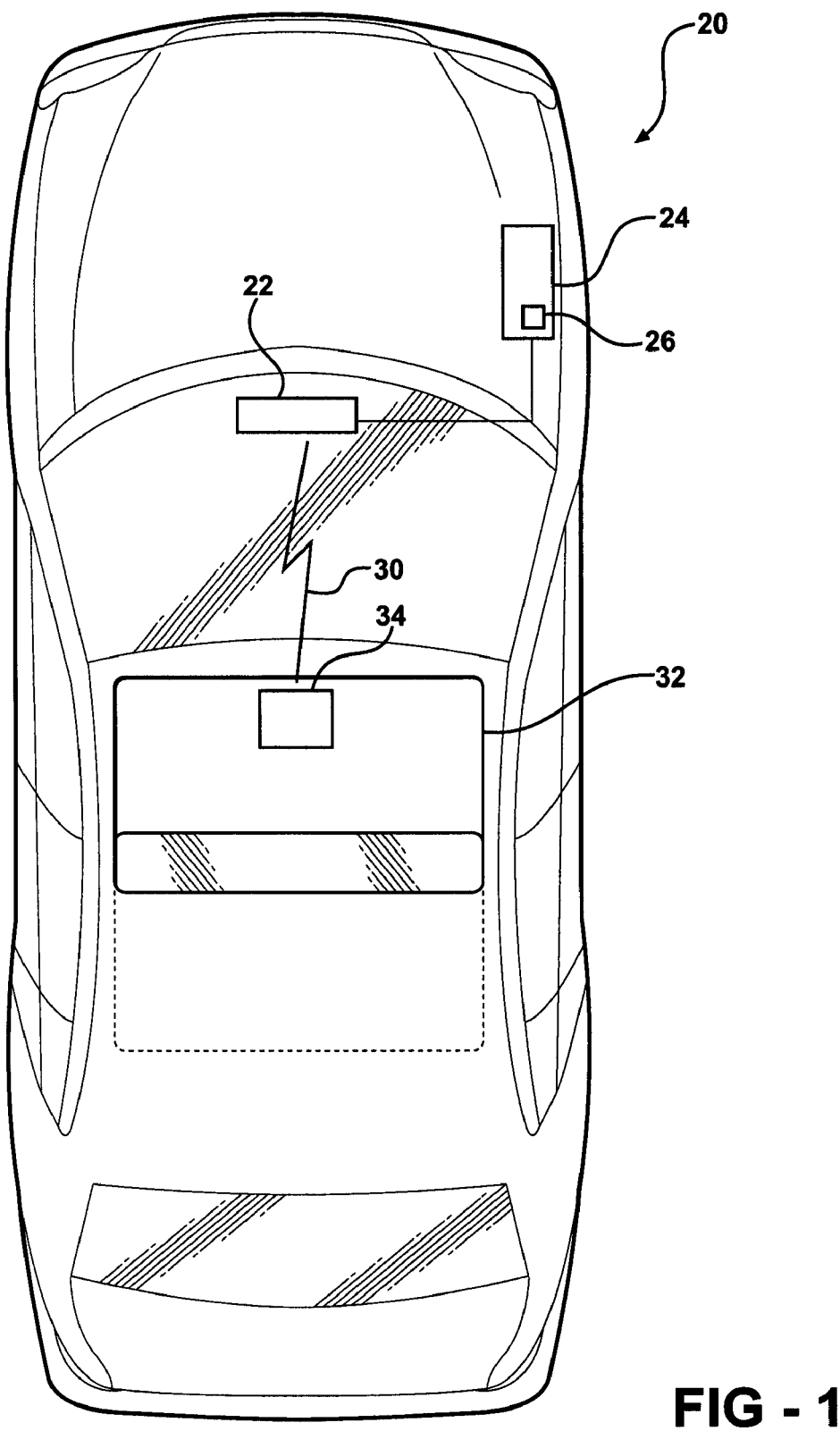
FIG. 1 is a schematic view of a vehicle.
Figure 2:
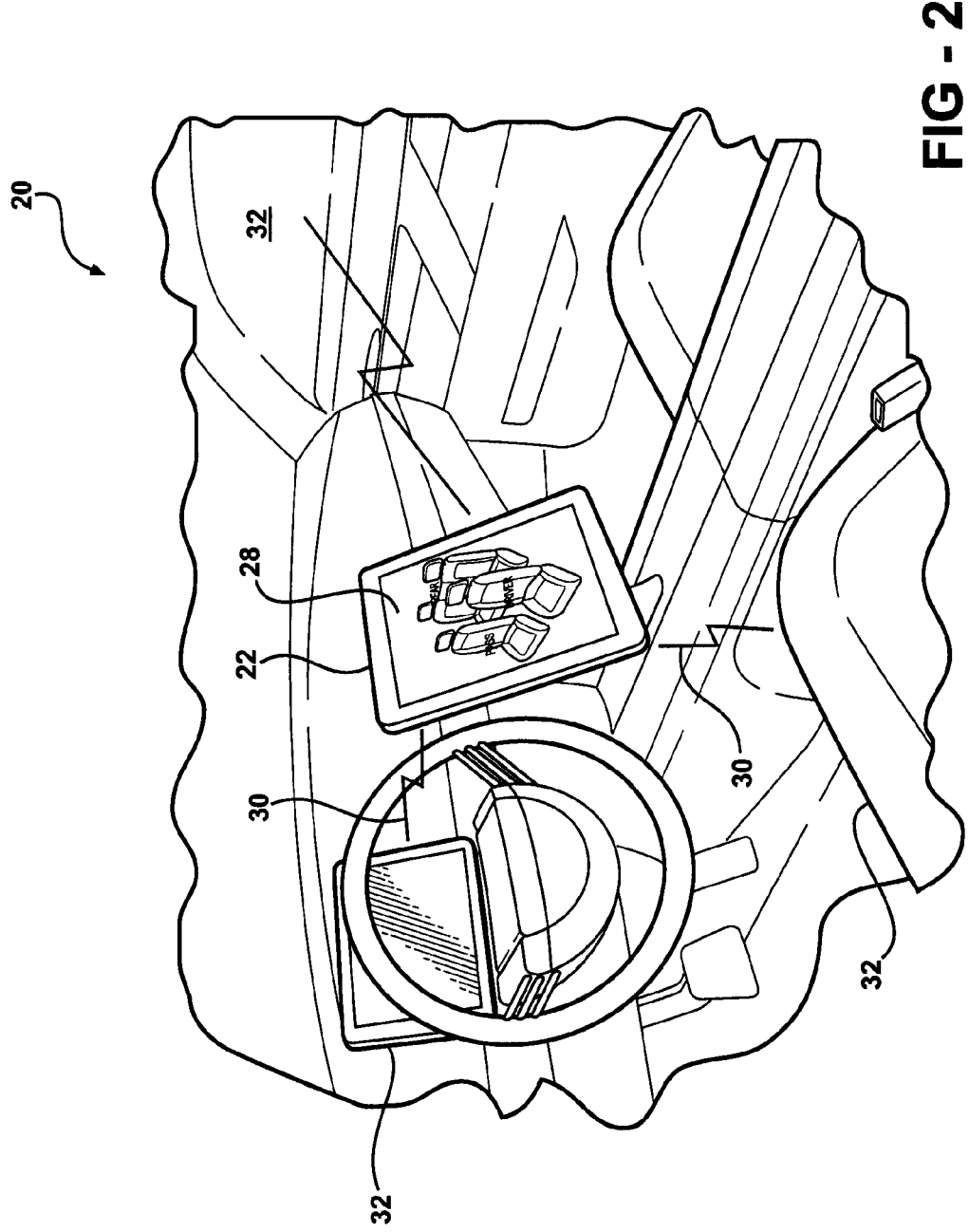
FIG. 2 is a perspective view of an interior of a vehicle.

Referring to FIGS. 1 and 2, the vehicle 20 comprises a controller 22. The controller 22 includes a processor 24 for running a software program thereon and a memory 26 for storing data. The controller 22 may comprise a computer integrated into the vehicle 20, or may include a laptop computer mounted to the vehicle 20. It should be appreciated that the controller 22 may also include some other device not specifically described herein.

A touch screen display 28 is in communication with the controller 22 for inputting commands into the controller 22. The touch screen display 28 preferably includes an LCD touch screen. However, it should be appreciated that the touch screen display 28 may include some other touch sensitive or interactive screen. The controller 22 and the touch screen display 28 may be integrally formed as a single unit, or alternatively may be separate components in communication with each other. The controller 22 and the touch screen display 28 are in communication through a communication system 30. The communication system 30 may include a hard wired communication system 30, or alternatively the communication system 30 may include a wireless communication system 30.

The vehicle 20 includes at least one accessory 32 operable in at least a first setting and a second setting. The first setting and the second setting may correspond to any two preferential settings for the accessory 32. For example, the preferential settings may include a first volume and a second volume for an audio entertainment system, a first position and a second position for a window or a sunroof, or a first temperature and a second temperature for a Heating Ventilation Air Conditioning ("HVAC") system. The first setting and the second setting may also include a query to the accessory 32. For example, if the accessory 32 is defined to include a sensor, the first setting may be defined as querying the sensor for information and the second setting may be defined as not querying the sensor for information. It should be appreciated that the first setting and the second setting may also correspond to some other command, settings, queries, positions, conditions, etc. not specifically described herein.

The at least one accessory 32 may include one of a group of accessories 32 comprising: a window actuator 34, a door actuator 34, a locking mechanism, an audio entertainment system, a visual entertainment system, a HVAC system, a power adjustment mechanism, a diagnostic mechanism, a sensor system and a lighting system. It should be appreciated that the accessory 32 may include some other vehicular accessory 32 not specifically described herein and that the vehicle 20 may and preferably does include a plurality of accessories 32.

Each of the accessories 32 may include an actuator 34, however, it should be appreciated that the accessory 32 need not require the actuator 34. Typically, the actuator 34 includes an electric motor; however it should be appreciated that the actuator 34 may include some other power source, such as a hydraulic power source or a pneumatic power source. If the accessory 32 includes the actuator 34, the actuator 34 moves the accessory 32 between the first setting and the second setting. For example, assuming the accessory 32 is defined to include a window, the actuator 34 moves the window between the first setting, i.e., a closed position, and a second setting, i.e., an open position.

The communication system 30 interconnects the controller 22 and the at least one accessory 32. The communication system 30 transmits a command inputted into the touch screen display 28 to the at least one accessory 32 to move the at least one accessory 32 between the first setting and the second setting. As described above, the communication system 30 may include a hard wired communication system 30 interconnecting the controller 22 and the accessories 32, or preferably, the communication system 30 includes a wireless communication system 30 interconnecting the controller 22 and the accessories. The wireless communication system 30 may include a Bluetooth system, a Zigbee system, a RF system, or some other similar wireless communication system 30.

Figure 3:
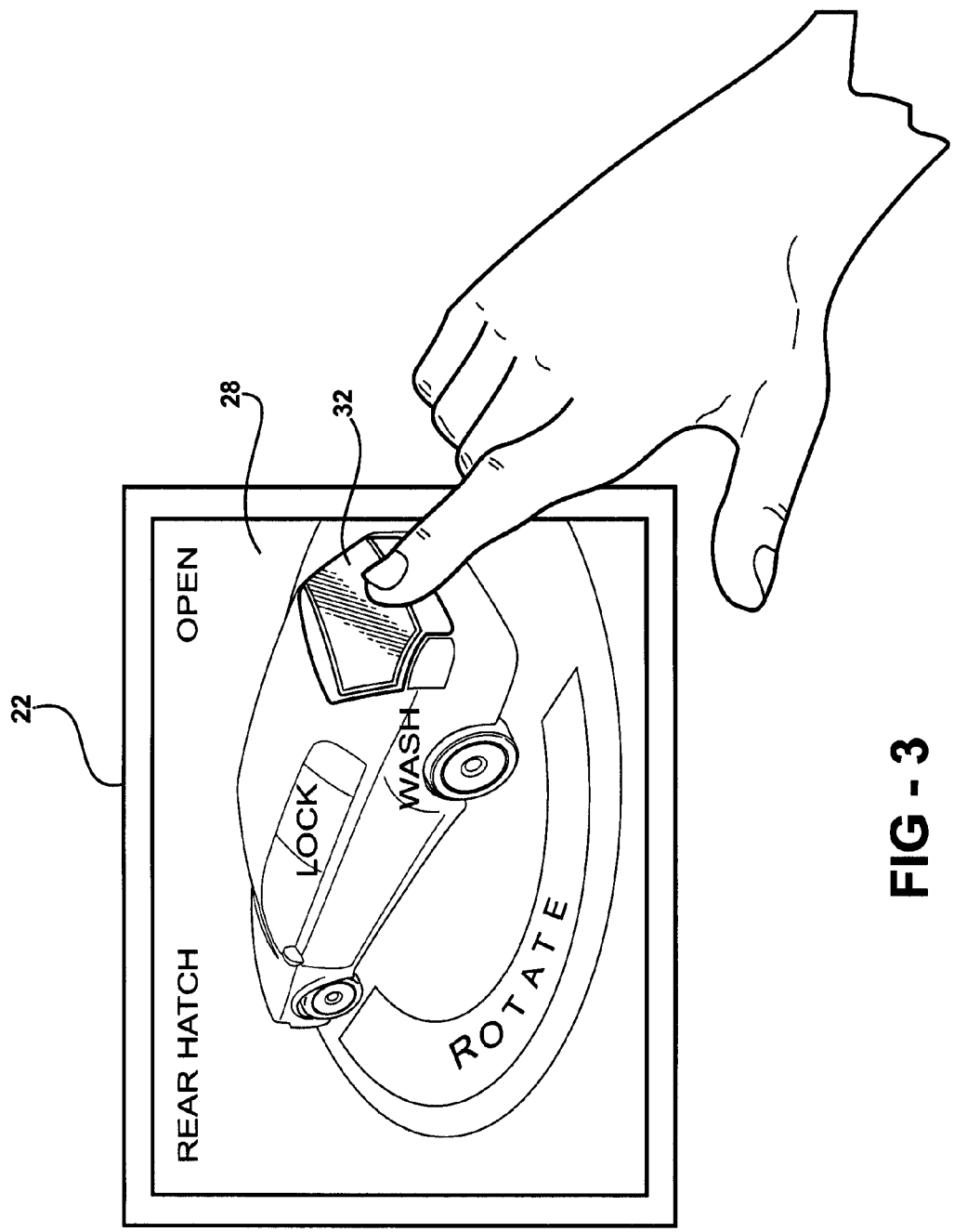
FIG. 3 is perspective view of a touch screen display showing a virtual image of the vehicle.

The subject invention also provides a method of operating the accessory 32 with the controller 22. Referring to FIG. 3, the method comprises the step of displaying a virtual image of the vehicle 20 on the touch screen display 28. A user touches the virtual image of the vehicle 20 on the touch screen display 28 to select the accessory 32. The virtual image of the vehicle 20 is preferably a three-dimensional image. Accordingly, the user may need to re-orient the virtual image of the vehicle 20 to locate the desired accessory 32, such as by rotating the virtual image of the vehicle 20. Therefore, the method may further comprise the step of manipulating the virtual image of the vehicle 20 on the touch screen display 28 to re-orient the virtual image of the vehicle 20.

Figure 4:
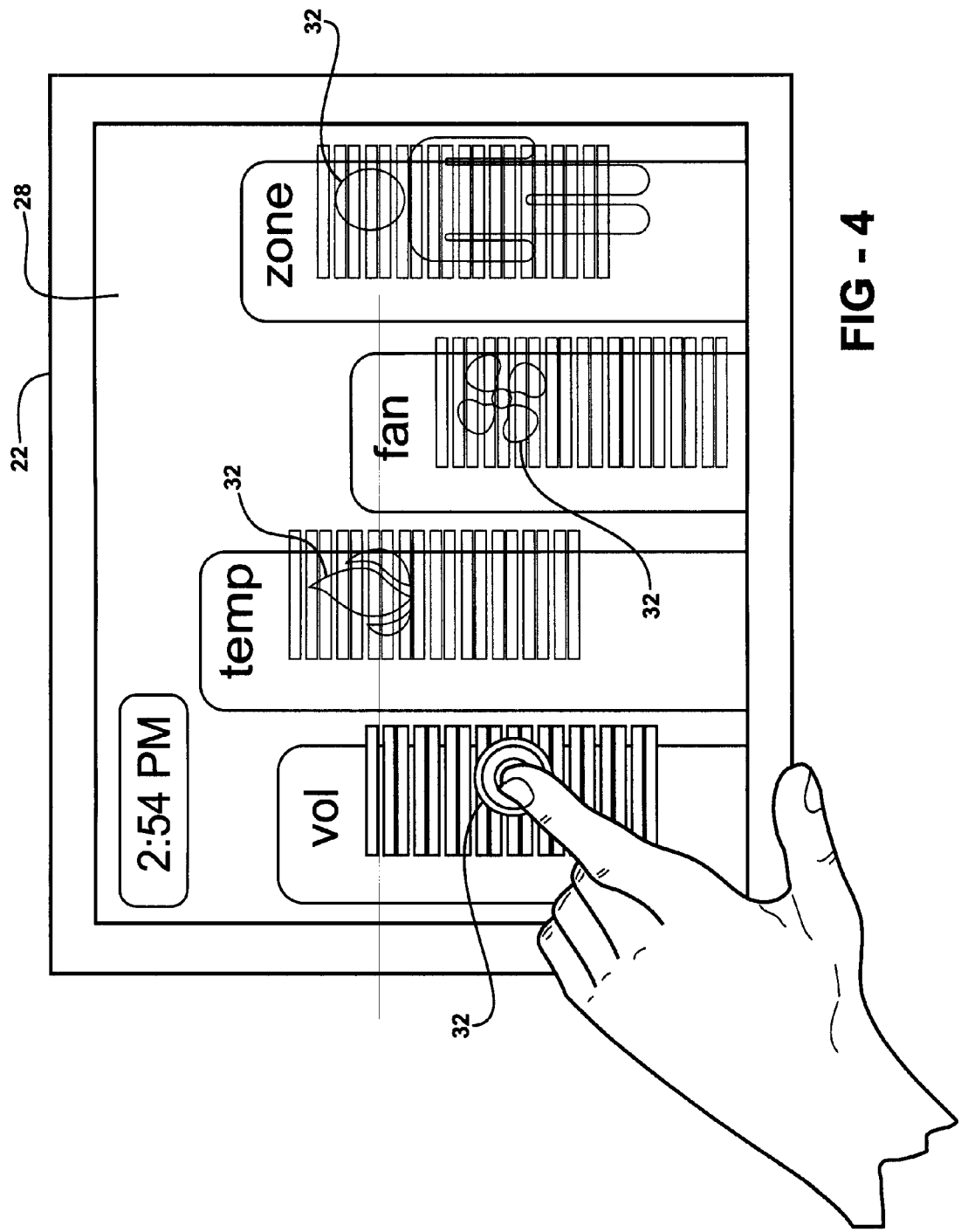
FIG. 4 is a perspective view of the touch screen display showing a virtual image of a plurality of accessories to select.
Figure 5:
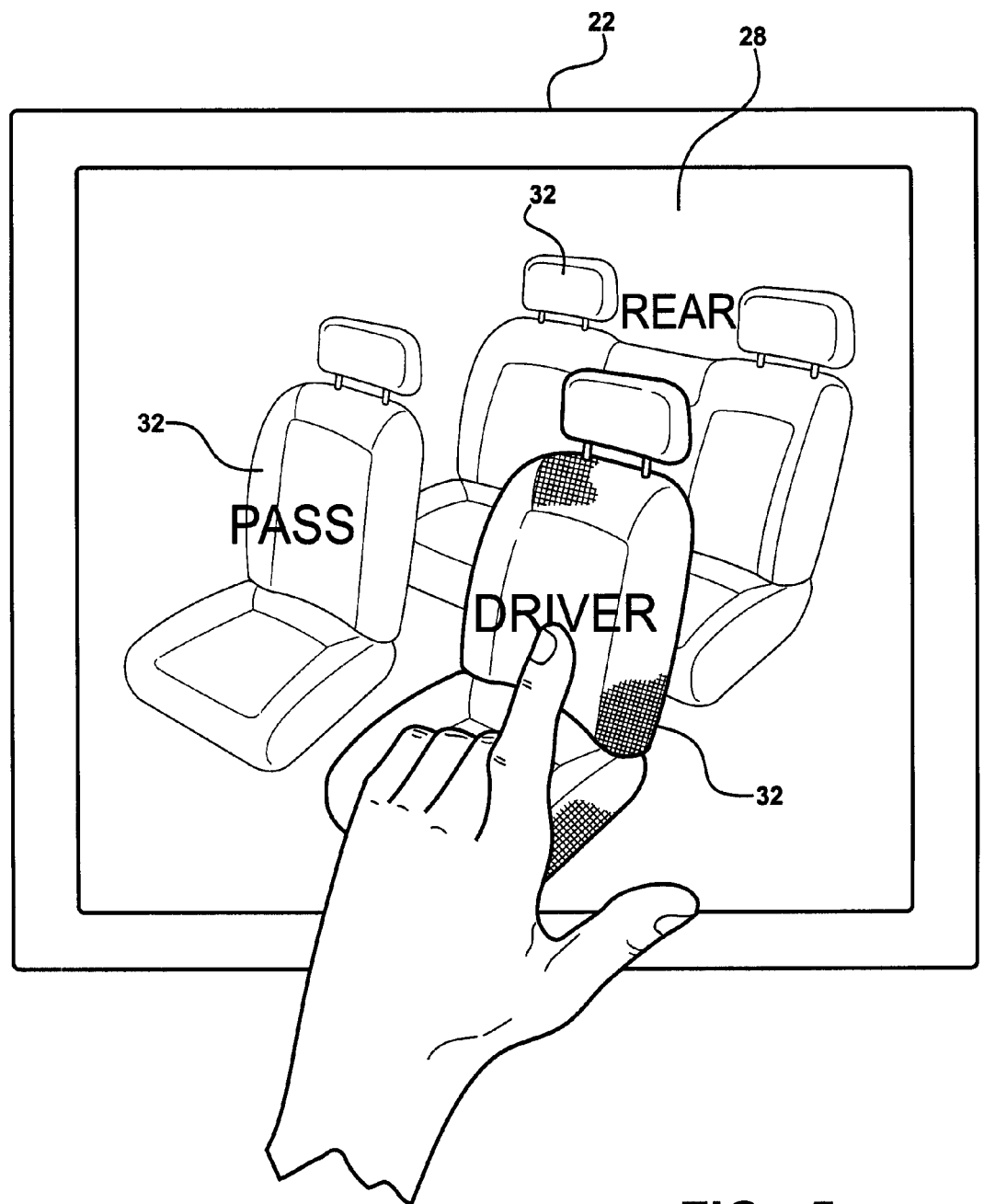
FIG. 5 of is a perspective view of the touch screen display showing a virtual image of an interior of the vehicle showing an accessory to select.
Figure 6:
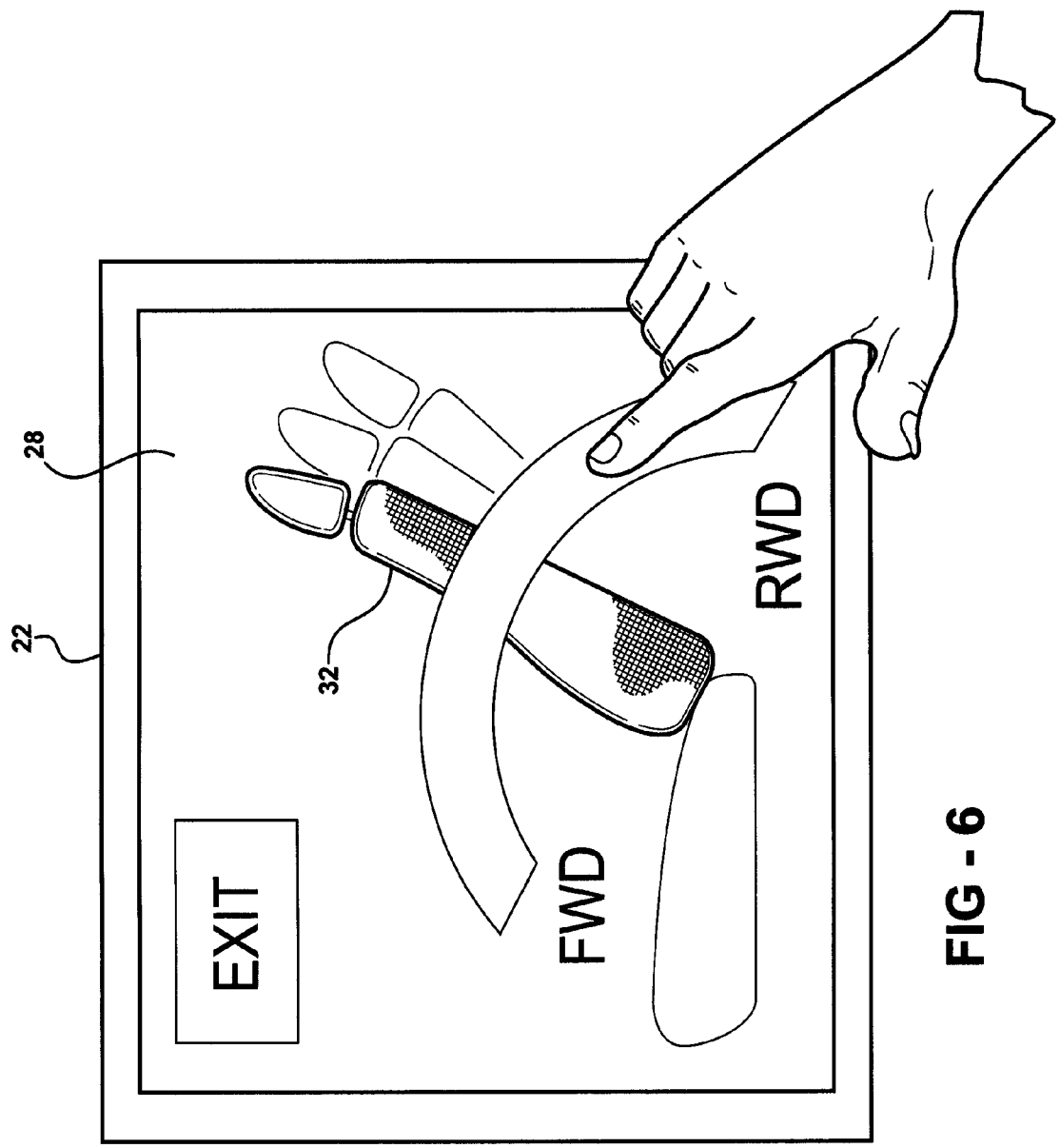
FIG. 6 is a perspective view of the touch screen display showing a command being inputted into the touch screen display.

Referring to FIGS. 4 through 6, the method further comprises the step of displaying a virtual image of the accessory 32 on the touch screen display 28. As the vehicle 20 preferably includes a plurality of accessories 32, the method further comprises the step of selecting one of the plurality of accessories 32 to display on the touch screen display 28. Once one of the accessories 32 is selected, the method may further comprise the step of displaying at least one optional command on the touch screen display 28 after selecting the accessory 32, such as is shown in FIG. 3. Alternatively, the method may further comprise the step of manipulating the virtual image of the accessory 32 on the touch screen display 28 to re-orient the virtual image of the accessory 32 between the first setting and the second setting, such as is shown in FIGS. 4 and 6.

The method further comprises the step of touching the touch screen display 28 to input a command for the accessory 32. If one or more optional commands are displayed on the touch screen display 28, the command may be inputted by touching one of the displayed optional commands. For example, if the accessory 32 is defined to include a power sunroof, the user may select the sunroof by touching the sunroof shown on the virtual image of the vehicle 20. Once the sunroof is selected, one or more optional commands may be displayed on the touch screen display 28, such as one command to "open" the sunroof and one command to "close" the sunroof. The user inputs the command by touching the optional command displayed on the touch screen display 28. Accordingly, the user would touch the "open" command to input a command to open the sunroof.

Alternatively, the command may be inputted by manipulating the virtual image of the accessory 32. The controller 22 may include gesture recognition software. The gesture recognition software is capable of recognizing symbolic inputted commands. A symbolic inputted command may include, for example, sliding a finger across the touch screen display 28 to symbolize movement of the accessory 32. For example, assuming the accessory 32 is defined to include the power sunroof as above, the user would select the accessory 32 by touching the sunroof on the virtual image of the vehicle 20. Once selected, the controller 22 may display a virtual image of the accessory 32, i.e., the sunroof, on the touch screen display 28. The user enters the command by manipulating the virtual image of the accessory 32 on the touch screen display 28. As such, the user would touch the virtual image of the sunroof and slide the virtual image of the sunroof to move the virtual image of the sunroof to an open position, thereby using gesture recognition to input a command to open the sunroof.

The method further comprises the step of transmitting the inputted command to the accessory 32. The inputted command is transmitted through the communication system 30 interconnecting the controller 22 and the accessory 32. If the communication system 30 includes the wireless communication system 30, the step of transmitting the inputted command is further defined as wirelessly transmitting the inputted command to the accessory 32. Accordingly, the command is inputted into the touch screen display 28 as described above. The command is communicated form the touch screen display 28 to the controller 22, where the controller 22 transmits the inputted command to the accessory 32. It should also be appreciated that the accessory 32 may transmit a signal to the controller 22 through the communication system 30, such as to indicate a failure in executing the command or an equipment failure. Because the accessory 32 receives the command to move between the first setting and the second setting from the controller 22 via the communication system 30, and the touch screen display 28 provides the means by which the commands are inputted for the accessory 32, there is no need to provide each individual accessory 32 with its own control switch and wiring connecting the control switch to the accessory 32. Accordingly, all or a portion of all control switches in the vehicle 20 may be eliminated by the subject invention.

The method further comprises the step of executing the command. Once the accessory 32 receives the inputted command from the controller 22, the accessory 32 executes the command by moving between the first setting and the second setting. For example, assuming the accessory 32 is defined as a power locking mechanism for a door of the vehicle 20, the first setting includes a locked position and the second setting includes an un-locked position, and the inputted command is to unlock the door, the actuator 34 would move the locking mechanism to the second setting to unlock the locking mechanism.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of operating an accessory of a vehicle with a controller in communication with the accessory and including a touch screen display, said method comprising the steps of:
    displaying a virtual image of the vehicle on the touch screen display in a first position;
    reorienting the virtual image of the vehicle on the touch screen display to a second position;
    displaying a virtual image of the accessory, which is not displayed with the virtual image of vehicle in the first position, together with the virtual image of the vehicle in the second position;
    touching the virtual image of the accessory on the touch screen display to select the accessory;
    touching the touch screen display to input a command for the accessory;
    transmitting the inputted command to the accessory; and
    executing the inputted command.

2. A method as set forth in claim 1 wherein the controller includes a wireless communication system in communication with the accessory and said step of transmitting the inputted command is further defined as wirelessly transmitting the inputted command to the accessory.

3. A method as set forth in claim 1 further comprising the step of displaying at least one optional command on the touch screen display after selecting the accessory.

4. A method as set forth in claim 1 wherein the vehicle includes a plurality of accessories and the method further comprises the step of selecting one of the plurality of accessories.

5. A method of operating an accessory of a vehicle, the vehicle having a controller in communication with the accessory and a touch screen display, the method comprising:
    displaying a virtual image of the vehicle in first position on the touch screen display;
    reorienting the virtual image of the vehicle to a second position on the touch screen display;
    displaying a virtual image of the accessory with the virtual image of the vehicle in the second position, the virtual image of the accessory not displayed with the virtual image of the vehicle in the first position;
    touching the virtual image of the accessory on the touch screen display to select the accessory;
    touching the touch screen display to input a command for the accessory;
    transmitting the inputted command to the accessory utilizing a wireless communication system; and
    controlling the accessory based on the inputted command.

6. An interface apparatus for use in a vehicle, said interface apparatus comprising:
    a controller;
    a touch screen display in communication with said controller, the touch screen display configured to display a virtual image of a vehicle in a first position, the touch screen display further configured to reorient the virtual image of the vehicle to a second position such that a virtual image of an accessory is displayed, said virtual image of the accessory not displayed with the virtual image of the vehicle in the first position, the touch screen display further configured to detect a touching of the virtual image of the accessory on the touch screen display to select the accessory, the touch screen display further configured to detect touching of the touch screen display to input a command into said controller;
    the accessory configured to have at least a first setting and a second setting;
    a communication system configured to interconnect the controller and the accessory, the communication system further configured to transmit the command to the accessory to move the accessory between said first setting and said second setting.

7. The interface apparatus of claim 6, wherein said communication system includes a wireless communication system.

8. The interface apparatus of claim 6, wherein said controller includes a processor.

9. The interface apparatus of claim 8, wherein said controller includes a memory for storing data.

10. The interface apparatus of claim 9, wherein said controller and said touch screen display communicate through said wireless communication system.

11. The interface apparatus of claim 6, wherein said accessory includes an actuator.

12. The interface apparatus of claim 11, wherein said actuator includes an electric motor.

13. A vehicle as set forth in claim 6, wherein said accessory includes one of: a window actuator, a door actuator, a locking mechanism, an audio entertainment system, a visual entertainment system, a HVAC system, a power adjustment mechanism, a diagnostic mechanism, a sensor system and a lighting system.

* * * * *